United States Patent [19]

Shoji et al.

[11] 4,247,154

[45] Jan. 27, 1981

[54] BRAKE CONTROL VALVE

[75] Inventors: Suzuki Shoji; Kamemoto Katsuaki, both of Yokosuka, Japan

[73] Assignee: Nippon Air Brake Co., Ltd., Kobe, Japan

[21] Appl. No.: 59,248

[22] Filed: Jul. 20, 1979

[30] Foreign Application Priority Data

Jul. 24, 1978 [JP] Japan ............... 53-101636[U]

[51] Int. Cl.³ .............................................. B60T 8/00
[52] U.S. Cl. ................... 303/24 A; 188/353; 192/13 A; 303/89
[58] Field of Search ............ 303/89, 24 A, 24 R; 192/13 A; 188/353, 265; 60/589

[56] References Cited

U.S. PATENT DOCUMENTS

| | | | |
|---|---|---|---|
| 2,030,288 | 2/1936 | Freeman | 192/13 A |
| 2,190,981 | 2/1940 | Freeman | 188/353 |
| 2,223,717 | 12/1940 | Coffman | 188/353 X |
| 2,574,923 | 11/1951 | La Brie | 60/589 |

Primary Examiner—Douglas C. Butler
Attorney, Agent, or Firm—McDougall, Hersh & Scott

[57] ABSTRACT

A brake control valve for an automobile includes a main body having first and second bores intersecting with each other; a ball valve member arranged in the first bore, and rolled by its weight when the automobile is facing upwardly on an inclined road-way; a valve seat arranged in the first bore, and engageable with the ball valve member to check brake fluid flow between a master cylinder and a wheel cylinder; and a cam shaft slidably fitted into the second bore and inter-connected to a clutch pedal, having a cam portion in a brake fluid passage. Areas of the cam shaft at both sides of the cam portion receiving fluid pressure are substantially equal to each other. The cam shaft is rotated round its axis with actuation of the clutch pedal to displace the ball valve member through the cam portion for opening and closing the valve seat when the automobile is facing upwardly on the inclined roadway.

15 Claims, 5 Drawing Figures

BRAKE CONTROL VALVE

BACKGROUND OF THE INVENTION

1. Field of the Invention

This invention relates to a brake control valve for an automobile, and more particularly to a brake control valve suitable for starting the automobile stopped facing upwardly on an inclined roadways.

2. Description of the Prior Art

Generally when the driver or operator will start the automobile stopped by a side braking system or a hand braking system, facing upwardly on an inclined roadway, the driver treads an accelerator pedal to raise the rotational speed of the internal combustion engine to a certain extent, while the driver actuates a clutch pedal to softly press a clutch disc to a fly wheel in a clutch system. Such a condition of the clutch system is generally called "semi-clutching condition". Next, the driver further treads the accelerator pedal to gradually start the automobile, releasing the brake of the hand braking system and maintaining the semi-clutching condition.

As above described, when the automobile stopped on the inclined road-way will be started, the hand lever of the hand braking system, the clutch pedal and the accelerator pedal should be operated almost at the same time. Such operations are very difficult for the driver inexperienced in drive of the automobile. The inexperienced driver sometimes fails to start the automobile. At such a time, the automobile moves back to collide with another automobile in some cases.

Such a brake control valve to facilitate the start of the automobile stopped on the inclined roadway was proposed that includes a one-way valve which is closed by a movable valve member when the automobile is facing upwardly on the inclined roadway, to check brake fluid flow from a wheel cylinder to a master cylinder, and a cam shaft interconnected to a clutch pedal, having a cam portion positioned in a brake fluid passage. The brake control valve is arranged in a brake fluid conduit between the master cylinder and the wheel cylinder. The cam portion is displaced with actuation of the clutch pedal to displace the movable valve member to open and close the one-way valve.

When the automobile using the above described brake control valve will be stopped facing upwardly on the inclined roadway, the master cylinder is actuated to apply the brake fluid pressure to the wheel cylinder. The clutch pedal is operated to disengage the clutch disc from the fly wheel in the direction that the brake fluid pressure is maintained in the brake fluid conduit. Thus, the one-way valve is closed to check the brake fluid flow from the wheel cylinder to the master cylinder. Although the foot of the driver is removed from the brake pedal, the brake fluid pressure is held in the conduit between the one-way valve and the wheel cylinder. For the start of the automobile, the clutch pedal is operated to softly press the clutch disc to the fly wheel, namely to put the clutch system into the semi-clutching condition. The one-way valve is opened to release the brake fluid pressure held in the conduit. The accelerator pedal is treaded simultaneously with the clutch operation, to raise gradually the speed of the engine. The automobile is started without operation of the hand braking system.

In the above-described brake control valve, one end portion of the cam shift is positioned at the exterior of the body of the brake control valve, while another end portion of the cam shaft is positioned in the brake fluid passage within the interior of the body of the brake control valve. Accordingly, the brake fluid pressure is applied to the other end of the cam shaft to press the latter to the inner wall of the brake control valve. For that reason, a force required to drive the cam shaft must be sufficient to overcome the brake fluid pressure in addition to being sufficient to rotate the shaft. In some cases, there was the serious problem that the brake control valve was not operated by actuation of the clutch pedal.

SUMMARY OF THE INVENTION

Accordingly, it is an object of this invention to provide a brake control valve which can be operated by a small force to start the automobile stopped facing upwardly on an inclined roadway.

Another object of this invention is to provide a brake control valve which is reliable and simple in construction.

A further object of this invention is to provide a brake control valve which can be easily manufactured.

In accordance with an aspect of this invention, a brake control includes a main body having first and second bores intersecting with each other; a movable valve member arranged in said first bore, and moved by its weight when the automobile is facing upwardly on an inclined road-way; valve means arranged in said first bore, and engageable with said movable valve member to check brake fluid flow between a master cylinder and a wheel cylinder; and a cam shaft slidably fitted into said second bore and interconnected to a clutch pedal, having a cam portion in a brake fluid passage, areas of said cam shaft at both sides of said cam portion receiving brake fluid pressure being substantially equal to each other; whereby said cam shaft is slideable with actuation of said clutch pedal to displace said movable valve member through said cam portion for opening and closing said valve means when said automobile is facing upwardly on said inclined roadway.

The foregoing and other objects, features, and advantages of the present invention will be more readily understood upon consideration of the following detailed description of the preferred embodiments of the invention, taken in conjunction with the accompanying drawings.

DETAILED DESCRIPTION OF THE PREFERRED EMBODIMENTS

Figure 1:
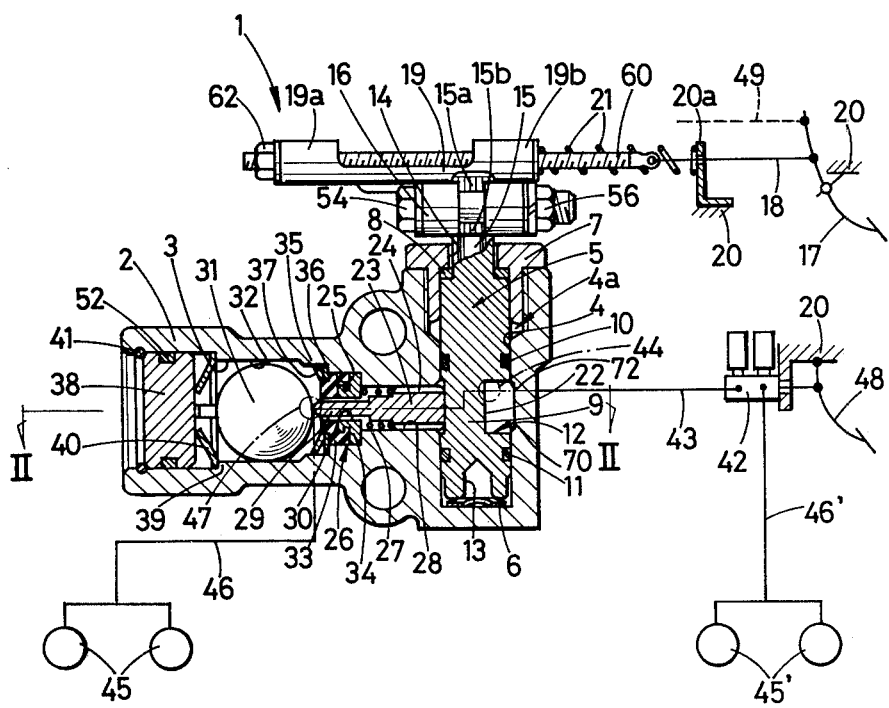
FIG. 1 is a cross-sectional view of a brake control valve according to a first embodiment of this invention.
Figure 2:
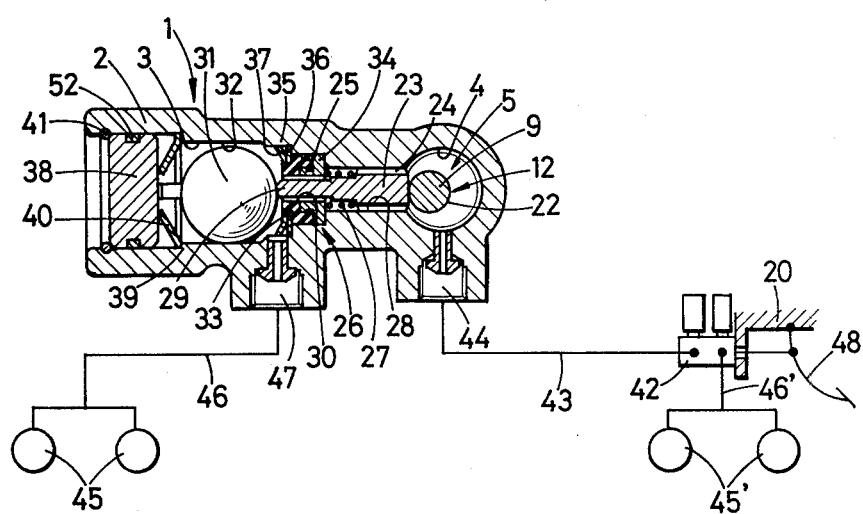
FIG. 2 is a cross-sectional view taken along the line II—II of FIG. 1.

Referring to FIG. 1 and FIG. 2, a brake control valve according to a first embodiment of this invention is generally indicated by a reference numeral 1. In a main body 2 of the brake control valve 1, a stepped cylindrical bore 3 is made in parallel with the direction of the movement of the automobile which is equipped with the brake control valve 1. Another stepped cylindrical bore 4 is so made in the main body 2 as to communicate vertically with the stepped cylindrical bore 3.

A cam shaft 5 as a control shaft is rotatably inserted into the other stepped cylindrical bore 4, and supported through a waved washer 6 by the closed end of the other stepped cylindrical bore 4. A plug 7 having a central hole 14 is screwed to an upper and larger cylindrical bore section of the stepped cylindrical bore 4. A top end portion 15 of the cam shaft 5 is reduced in diameter, and inserted through the central hole 14 of the plug 7. A low-friction washer 8 formed of synthetic resin (for example, Teflon-tradename-:Tetrafluoro-ethylene) impregnated with oil is interposed between the shoulder of the cam shaft 5 and the inner bottom surface of the plug 7. In the above-described manner, the cam shaft 5 is so supported as to be rotatable round its axis.

The cam shaft 5 is provided with a cam portion 9 reduced in diameter and eccentric with respect to its axis. The cam portion 9 is facing to the right opening of the stepped cylindrical bore 3. At both sides of the cam portion 9, the cam shaft 5 is sealed by seal rings 10 and 11. The sealed portions of the cam shaft 5 are equal to each other in diameter. A cam chamber 12 communicating with the stepped cylindrical bore 3 is formed by the circumferential surface of the cam portion 9 and the inner wall surface of the stepped cylindrical bore 4 between the sealed portions of the cam shaft 5.

A recess 13 is formed in the lower end of the cam shaft 5, so that a volume of an air space sealed by the seal ring 11 is enlarged between the cam shaft 5 and the closed end of the stepped cylindrical bore 4. The diameter-reduced end portion 15 projects through the central hole 14 of the plug 7 to the external of the main body 2. A pair of notches 15a and 15b are formed on the circumferential surfaces of the diameter-reduced end portion 15 of the cam shaft 5.

Figure 3:
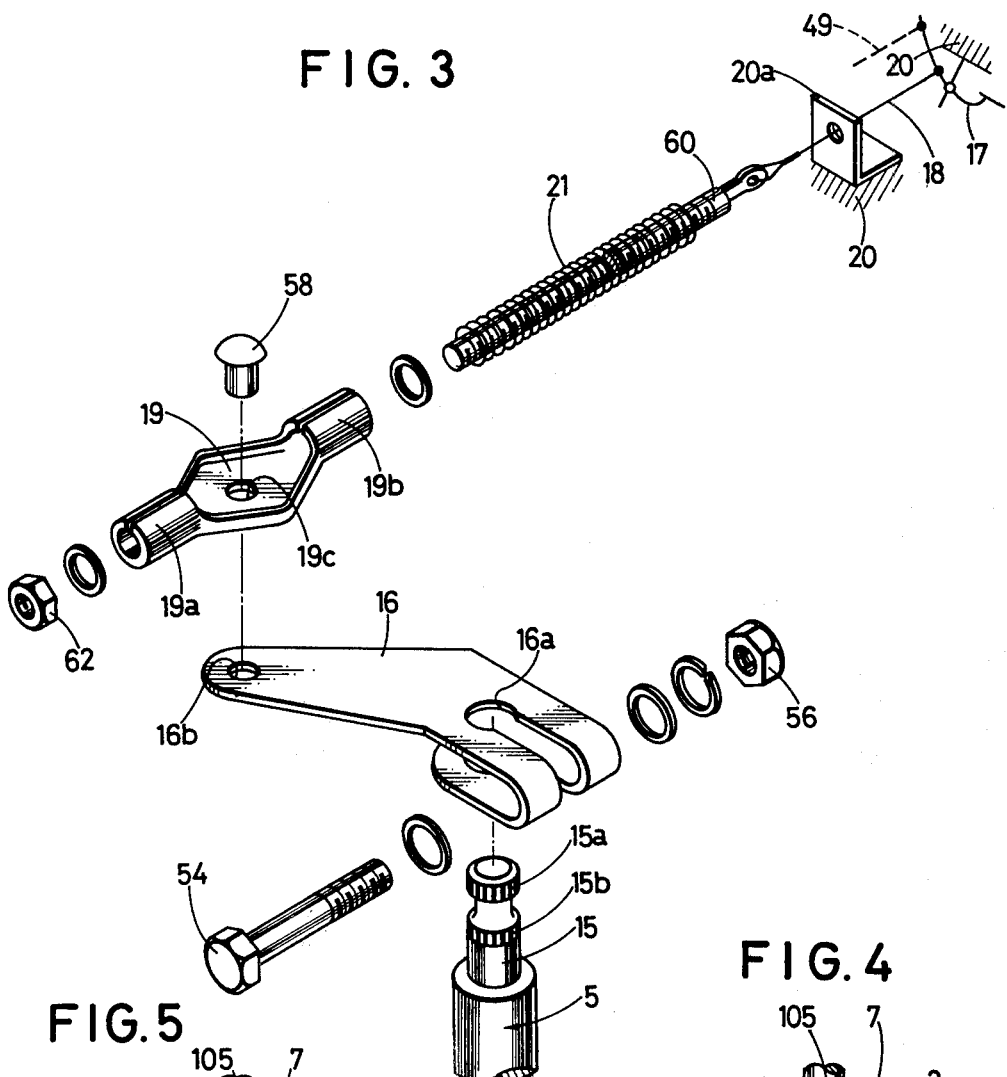
FIG. 3 is an exploded perspective view of a part of the brake control valve of FIG. 1.

As clearly shown in FIG. 3, an operating lever 16 is arranged over the cam shaft 5. One end portion of the operating lever 16 is bent and has a cut-out portion 16a. The end portion 15 of the cam shaft 5 is engaged at the notches 15a and 15b with the cut-out portion 16a of the operating lever 16. The cam shaft 5 and the operating lever 16 are fixed to each other by means of bolt 54 and nut 56.

An interconnecting member 19 is arranged above another end portion of the operating lever 16. A rivet 58 is inserted through an central opening 19c of the interconnecting 19 and an opening 16b made in the operating lever 16. A top end of the rivet 58 is squashed, alothough the squash is not shown in FIG. 3. It is prevented thereby from falling out. The interconnecting member 19 and the operating lever 16 are pivotally connected to each other by the rivet 58.

A clutch pedal 17 is connected through a wire 18, a rod 60 connected to the wire 18 and a nut 62 screwed to the rod 60, to the interconnecting member 19. The wire 18 is connected to a lever of the clutch pedal 17. One end of the rod 60 is connected to the wire 18. A spring support 20a is fixed to a part of a chassis 20. The wire 18 passes through an opening made in the spring support 20a. The rod 60 passes through a pair of tube portions 19a and 19b of the interconnecting member 19. A thread is formed on the rod 60. The nut 62 is screwed to the top end of the rod 60. Thus, the interconnecting member 19 is connected to the clutch pedal 17. Further, a clutch wire 49 leading to a clutch system (not shown) is connected to the lever of the clutch pedal 17.

A coil spring 21, whose spring force is relatively small, is wound on the rod 60 between the spring support 20a and the interconnecting member 19. It is compressed by fastening the nut 62. Thus, the interconnecting member 19 is urged leftwards in FIG. 1 by the compressed spring 21. Accordingly, when the clutch pedal 17 is not actuated, the interconnecting member 19 assumes the left position shown in FIG. 1, and the cam shaft 5 is put at the angular position shown in FIG. 1 and FIG. 2 through the operating lever 16 which is urged in the counter-clockwise direction (FIG. 3) round the axis of the cam shaft 5 by the spring force of the coil spring 21. A right end of a plunger 23 to be described hereinafter in detail contacts with a cam surface 22 of the cam portion 9 of the cam shaft 5. The plunger 23 is held at its leftmost position in the condition shown in FIG. 1 and FIG. 2.

The plunger 23 is slidably fitted to a smaller cylinderical bore section 28 of the stepped cylindrical bore 3. A valve seat 26 is tightly fitted to a middle cylindrical bore section 25, of the stepped cylindrical bore 3. A top end portion 29 of the plunger 23, which is reduced in diameter, is inserted through a central opening 30 of the valve seat 26, to contact with a ball valve member 31 which is rollably received by a larger cylindrical bore section 32 of the stepped cylindrical bore 3.

Axial grooves 24 are made in the circumferential surface of the larger portion of the plunger 23, through which a brake fluid can flow. A spring 27, whose spring force is relatively small, is arranged between the valve seat 26 fitted to the middle cylindrical bore section 25 and the larger portion of the plunger 23 to urge the plunger 23 rightwards (FIG. 1), so that the right end of the plunger 23 always contacts with the cam surface 22 of the cam portion 9 of the cam shaft 5.

The valve seat 26 for the ball valve member 31 consists of an annular seat member 33 formed of synthetic rubber, and an annular support 34 for supporting the seat member 33. The sealing between the inner wall of the middle cylindrical bore section 25 of the stepped cylindrical bore 3, and the valve seat 26 is effected by the seat member 33. The valve seat 26 is fixed to the middle cylindrical bore section 25 by a support washer 36 and a projecting washer 37 fitted to a step 35 formed between the middle cylindrical bore section 25 and the larger cylindrical bore section 32.

A left opening of the stepped cylindrical bore 3 is closed by a cover member 38. The latter is pushed by a projecting washer 40 fitted to a step 39 made in the larger cylindrical bore section 32, to contact with a stopper ring 41 fitted to the left end of the stepped cylindrical bore 3. Thus, the cover member 38 is fixed to the stepped cylindrical bore 3. The stepped cylindrical bore 3 is sealed against the exterior of the main body 2 by a seal ring 52 fitted to an annular groove in the circumferential surface of the cover member 38.

A brake tandem master cylinder 42 which is diagrammatically shown in FIG. 1 and FIG. 2, is supported on a part of the chassis 20, and it is actuated by a brake pedal 48. A brake fluid pressure chamber in the tandem master cylinder 42 is connected through a conduit 43 to an inlet 44 made in the main body 2 of the brake control valve 1. The inlet 44 communicates with the cam chamber 12 in the other stepped cylindrical bore 4. On the other hand, an outlet 47 is made between the middle cylindrical bore section 25 and the larger cylindrical bore section 32 in the main body 2. The outlet 47 of the main body 2 is connected through a conduit 46 to wheel cylinders (not shown) of brake apparatus 45 arranged in wheels. In the illustrated embodiment, the brake control valve 1 is arranged between the tandem master cylinder 42 and the brake apparatus 45 of either of the front and rear wheels. However, brake control valves may be arranged between the tandem master cylindrical 42 and brake apparatus of front wheels, and between the tandem master cylinder 42 and brake apparatus of rear wheels, respectively. In that case, another brake control valve having the same construction as the brake control valve 1 is arranged in a conduit 46' connecting the tandem master cylinder 42 with brake apparatus 45' of the other of the front and rear wheels.

Next, there will be described operations of the above-described brake control valve 1.

When the automobile should be brought to a stop facing upwardly on an inclined roadway, the brake pedal 48 is treaded by the operator to actuate the master cylinder 42. A brake fluid pressure is applied from the master cylinder 42 to the wheel cylinders of the brake apparatus 45 and 45'. Since the automobile is facing upwardly on the inclined roadway, and the stepped cylindrical bore 3 is parallel with the direction of the movement of the automobile, the ball valve member 31 is urged rightward due to its weight. However, the ball valve member 31 is stopped by the top end portion 29 of the plunger 23 projected from the central bore 30 of the valve seat 26, when the plunger 23 contacts with the cam surface 22 of the cam portion 9 of the cam shaft 5 positioned as shown in FIG. 1 and FIG. 2. Thus, the ball valve member 31 is separated from the valve seat 26, unless the operator treads the clutch pedal 17 to effect the clutch operation.

The clutch pedal 17 is actuated by the operator in the condition that the brake fluid pressure is held in the conduits 43 and 46. The interconnecting member 19 is moved rightwards (FIG. 1) with the rotation of the clutch pedal 17 against the spring 21. The operating lever 16 connected to the interconnecting member 19 is rotated in the clockwise direction round the axis of the cam shaft 5 with the rightward movement of the interconnecting member 19. Thus, the cam shaft 5 fixed to the operating lever 16 is rotated in the clockwise direction (FIG. 2) round its axis.

The plunger 23 is moved rightwards by spring action of the spring 27 with the clockwise rotation of the cam portion 9 of the cam shaft 5, since the right end of the plunger 23 contacts with the cam surface 22 of the cam portion 9. The ball valve member 31 rolls to contact with the valve seat 26, with the rightward movement of the plunger 23, when the top end portion of the plunger 23 is withdrawn into the central hole 30 of the valve seat 26. Thus, the master cylinder side conduit 43 is separated from the wheel cylinder side conduit 46. The communication between the master cylinder 42 and the wheel cylinder 45 is prevented by the engagement of the ball valve member 31 with the valve seat 26.

Next, the brake pedal 48 is released from the foot of the operator. The brake fluid in the master cylinder side conduit 43 is released from pressure. However, the fluid pressure is held in the wheel cylinder side conduit 46. Without operation of a side brake system, the automobile is maintained in the stop condition only by treading the clutch pedal 17.

To start the automobile, the operator shifts the gears and gradually releases the clutch pedal 17 from treading. The clutch mechanism connected to the clutch wire 49 is put into the semi-clutching condition. At the same time, the interconnecting member 19 starts to be moved leftwards (FIG. 1) by spring action of the spring 21. Accordingly, the cam shaft 5 is rotated in the counter-clockwise direction through the operating lever 16. The cam portion 9 is rotated back to the orginal position shown in FIG. 1 and FIG. 2. The plunger 23 contacting with the cam surface 22 of the cam portion 9 is moved leftwards against the spring 27 to separate the ball valve member 31 from the valve seat 26. Accordingly, the brake fluid in the wheel cylinder side conduit 46 is released from pressure. Thus, the brake fluid is permitted to flow back to the master cylinder 42. In such a condition, the operator steps on the accelerator pedal to raise the speed of the engine. Thus, the automobile starts to run.

In the above described brake control valve 1, the portions of the cam shaft 5 in which the seal rings 10 and 11 are fitted, are equal to each other in diameter. In other words, the upper and lower areas of the cam shaft 5 receiving the brake fluid pressure applied from the cam chamber 12 are equal to each other. Accordingly, the brake fluid pressures opposite to each other applied to the cam shaft 5 at both sides of the cam chamber 12 are equal to each other, and are balanced with each other. In other words, the brake fluid pressure applied to the cam shaft 5 is totally equal to zero. For that reason, the cam shaft 5 can be actuated by a small force. Further, the brake control valve 1 is not complicated in construction for such an effect, since only the seal ring 11 is required.

When the cam shaft 5 is inserted into the stepped cylindrical bore 4 in the assembling process of the brake control valve 1, air is confined and compressed between the lower end of the cam shaft 5 and the closed end of the stepped cylindrical bore 4 due to the seal ring 11. The cam shaft 5 is somewhat upwards by the compressed air. A force to actuate the cam shaft 5 increases as much. Some brake fluid might enter the air chamber formed between the lower end of the cam shaft 5 and the closed end of the stepped cylindrical bore 4 through the slight gap between the seal ring 11 and the inner wall surface of the stepped cylindrical bore 4. The air is compressed to increase the upward force pushing the cam shaft 5. According to this embodiment, the recess 13 is made in the lower end of the cam shaft 5 as to enlarge the volume of the air chamber formed between the lower end of the cam shaft 5 and the closed end of the stepped cylindrical bore 4. Thus, the compression rate of the air in the assembling process of the brake control valve 1 and due to the entrance of the brake fluid is reduced as much. Further since the low-frictional washer 8 is interposed between the shoulder of the cam shaft 5 and the plug 7, the cam shaft 5 can be rotated by a small force, although the cam shaft 5 is pressed through the low-frictional washer 8 to the plug 7 fixed to the main body 2.

In the above-described embodiment, the wave washer 6 may be omitted to furthr reduce the force to actuate the cam shaft 5. Or a passage may be so made in the main body 2 as to make the air chamber communicate with the exterior of the brake control valve 1, or as to make the air chamber communicate with an air chamber 4a which is formed over the seal ring 10 in the stepped cylindrical bore 4. However, it is more preferable that the recess 13 is made in the lower end of the cam shaft 5 than that the passage is made in the main body 2.

Figure 4:
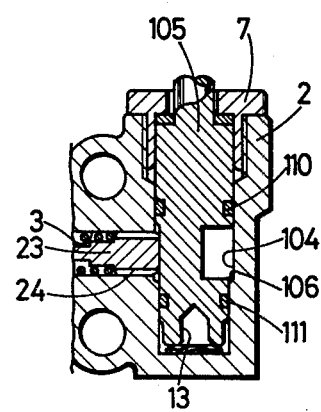
FIG. 4 is a cross-sectional view of an important part of a brake control valve according to a second embodiment of this invention.

FIG. 4 shows an important part of a brake control valve according to a second embodiment of this invention. Parts in this embodiment which correspond to those in the above described embodiment, are denoted by the same reference numerals, the description of which will be omitted.

A second stepped cylindrical bore 104 is so made in the main body 2 as to be substantially vertical to the first stepped cylindrical bore 3, in the same manner as in the first embodiment. A cam shaft 105 is rotatably fitted to the second stepped cylindrical bore 104. Seal rings 110 and 111 are fitted to upper and lower portions of the cam shaft 105 which are slightly different from each other in diameter. For example, the diameter of the lower portion of the cam shaft 105 to which the seal ring 111 is fitted, is smaller by about 1 mm than that of the upper portion of the cam shaft 105 on which the seal ring 110 is fitted. Correspondingly, a slant step 106 is formed in the stepped cylindrical bore 104.

In the embodiment of FIG. 1, a portion of the second stepped cylindrical bore 4 adjacent to the right opening of the first stepped cylindrical bore 3 is enlarged in diameter, as indicated by slant steps 70 and 72, in order to prevent the seal ring 11 from being damaged by an edge of the right opening of the first stepped cylinderical bore 3 when the cam shaft 5 is inserted into the second stepped cylindrical bore 4 in the assembling process of the brake control valve 1. However, it is troublesome to manufacture the stepped cylindrical bore 4 having the intermediate enlarged portion as indicated by the slant steps 70 and 72.

On the other hand, in the second embodiment of FIG. 4, the lower portion of the stepped cylindrical bore 104 is reduced in diameter, as indicated by the slant step 106 which is positioned below the right opening of the first stepped cylindrical bore 3. It is easy to manufacture the slant step 106 in the stepped cylindrical bore 104.

The areas of the upper and lower portions of the cam shaft 105 receiving the brake fluid pressure at both sides of the cam chamber are slightly different from each other. Accordingly, a force is applied upwards to the cam shaft 105 to press the latter to the main body 2. However, it is too small to restrict the rotation of the cam shaft 105. It is practically out of the question.

Figure 5:
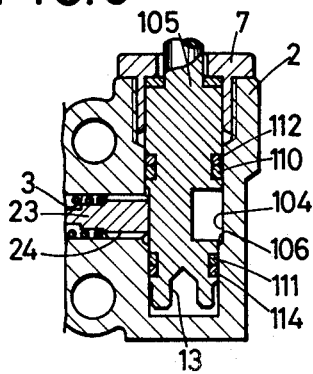
FIG. 5 is a cross-sectional view of an important part of a brake control valve according to a third embodiment of this invention.

FIG. 5 shows an important part of a brake control valve according to a third embodiment of this invention. Parts in this embodiment which correspond to those in FIG. 1 to FIG. 4, are denoted by the same reference numerals, the description of which will be omitted.

In the above-described embodiments, there is, under some conditions, the fear that the outer edge portions of the seal rings 10, 11, 110 and 111 are deformed to slip into the slight gap leading to the air chamber, between the circumferential surface of the cam shaft 5 or 105 and the inner wall surface of the second stepped cylindrical surface 4 or 104, since the high fluid pressure is applied from the cam chamber 12. Such fear can be removed by the embodiment of FIG. 5. If the outer edge portions are deformed to slip into the slight gap between the circumferential surface of the cam shaft 5 or 105 and the inner wall surface of the second stepped cylindrical surface 4 or 104, they are liable to be damaged with the rotation of the cam shaft 5 or 105.

In the embodiment of FIG. 5, backup rings 112 and 114 are superposed on the seal rings 110 and 111, respectively. The one backup ring 112 is put above the seal ring 110, namely at the air chamber side. The other backup ring 114 is below the seal ring 111, namely at the other air chamber. For example, the backup rings 112 and 114 may be formed of sythetic resin such as Nylon or Telfon. The outer edge portions of the seal rings 110 and 111 can be prevented from being deformed to slip into the slight gap, by the backup rings 112 and 114. Further, the waved washer 6 is omitted in this embodiment.

While the preferred embodiments have been described, variations thereto will occur to those skilled in the art within the scope of the present inventive concepts which are delineated by the following claims.

For example, in the above-described embodiments, the cam shaft 5 or 105 is rotated round its axis through the wire 18 connected to the clutch pedal 17. However, the cam shaft 5 or 105 may be so designed as to be slided in its axial direction in operation. In that case, a suitable cam portion is formed on the cam shaft 5 or 105, instead of the cam portion 9, and parts to be associated with the cam shaft 5 or 105 are so designed as to slide the cam shaft 5 or 105 in its axial direction with actuation of the clutch pedal 17.

In the above-described embodiment, the cam shaft 5 or 105 is driven through the wire 18 by treading the clutch pedal 17. However, it may be driven by a clutch fluid pressure from a clutch master cylinder.

Further, in the above-described embodiments, the ball valve member 31 is controlled by the plunger 23 following the cam surface 22 of the cam portion 9. However, without using the plunger 23, a brake control valve according to this invention may be so designed that the ball valve member 31 contacts directly with the cam surface 22 of the cam portion 9.

When the brake control valves 1 according to the above described embodiment are used for the front wheel brake system and the rear wheel brake system, respectively, the stepped cylindrical bore 4 may be so designed as to be used in common. In that case, one cam shaft is inserted into the common stepped cylindrical bore, and two cam portions are formed on the cam shaft. And first stepped cylindrical bores 3 are made in the main body 2 in parallel with each other, corresponding to the cam portions of the common cam shaft, and the ball valve members 31 and the plungers 23 are arranged in the first stepped cylindrical bores, respectively.

Further, in the above-described embodiment, the valve member 31 is a ball. However, it is not limited to a ball. Any valve member which can move, slide or roll on the cylindrical bore when the automobile is facing upwardly on an inclined roadway, may be used in the brake control valve according to this embodiment. For example, a valve member in the shape of parallelepiped may be used if it can slide when the automobile is facing upwardly on an inclined roadway.

Further in the above-described embodiments, the ball valve member 31 is received by the larger cylindrical bore section 32 of the first stepped cylindrical bore 3. However, it may be received by a cup-shaped ball guide which is, in turn, received by the larger cylindrical bore section 32.

What is claimed:
1. A brake control valve for an automobile having a master cylinder and a wheel cylinder comprising
   (A) a main body having first and second bores intersecting with each other, said bores defining a brake fluid passage between said master cylinder and wheel cylinder;

(B) a movable valve member arranged in said first bore, and moved by its weight when the automobile is facing upwardly on an inclined roadway;

(C) valve means arranged in said first bore, and engageable with said movable valve member to check brake fluid flow between said master cylinder and wheel cylinder;

(D) a cam shaft movably fitted into said second bore and interconnected to a clutch pedal, said cam shaft having a cam positioned in said brake fluid passage; and (E) seal rings fitted to the circumferential surface of said cam shaft on opposite sides of said cam portion, said cam shaft being movable upon actuation of said clutch pedal to displace said movable valve member in response to driving action of said cam portion for opening and closing said valve means when said automobile is facing upwardly on said inclined roadway.

2. A brake control valve according to claim 1 in which the opposite surface areas of said cam shaft exposed to said brake fluid on opposite sides of said cam portion are substantially equal to each other.

3. A brake control valve according to claim 1 in which said second brake bore has an open end side and a closed end side, and wherein the portion of said cam shaft to which one of said seal rings is fitted at the open end side of said second bore is slightly larger in surface area than the portion of said cam shaft to which the other of said seal rings is fitted at the closed end side of said second bore.

4. A brake control valve according to claim 1 in which the cross section of said cam shaft is circular, and said cam shaft is rotatably fitted into said second bore.

5. A brake control valve according to claim 4 in which the portions of said cam shaft to which said seal rings are fitted are substantially equal to each other in diameter.

6. A brake control valve according to claim 4 in which said second bore has an open end side and a closed end side, and wherein the portion of said cam shaft to which one of said seal rings is fitted at the open end side of said second bore is slightly larger in diameter than the portion of said cam shaft to which the other of said seal rings is fitted at the closed end side of said second bore.

7. A brake control valve according to claim 4 including back-up rings superimposed on said seal rings, said second bore has an open end side and a closed end side, one of said back-up rings being disposed toward the open end side of said second bore, and the other of said back-up rings being disposed toward the closed end side of said second bore.

8. A brake control valve according to claim 4 in which said second bore has an open end side and a closed end side, and including a recess formed in one end of said cam shaft at the closed end side of said second bore to provide an air chamber formed between said one end of the cam shaft and the closed end of said second bore.

9. A broke control valve according to claim 8 including a wave washer interposed between said one end of the cam shaft and the closed end of said second bore.

10. A brake control valve according to claim 4 in which said second bore has an open end side and a closed end side, and including a cover member for closing the open end side of said second bore, and a low-friction ring interposed between said cover member and the end of said cam shaft at the open end side of said second bore.

11. A brake control valve according to claim 4 including a plunger slidably fitted within said first bore, said plunger being interposed between said cam portion of the cam shaft and said movable valve member, one end of said plunger contacting the cam surface of said cam portion to follow the latter, and the other end of said plunger facing said movable valve member.

12. A brake control valve according to claim 4 in which said cam portion comprises a reduced-diameter, eccentric section of said cam shaft.

13. A brake control valve according to claim 1 including a flexible drive member connecting said cam shaft to said clutch pedal.

14. A brake control valve according to claim 13 in which said cam shaft is rotated around its axis in response to movement of the clutch pedal.

15. A brake control valve according to claim 1 in which said movable valve member is a ball.

* * * * *